United States Patent
Yabe et al.

(10) Patent No.: US 9,523,182 B2
(45) Date of Patent: Dec. 20, 2016

(54) WORK VEHICLE

(71) Applicant: KOMATSU LTD., Tokyo (JP)

(72) Inventors: Mitsuo Yabe, Hiratsuka (JP); Akihiro Ohsawa, Kanagawa (JP); Toshiya Shintani, Chigasaki (JP); Teruyuki Matsuki, Hadano (JP); Yoshiaki Yoshida, Hiratsuka (JP); Yosuke Yamagoe, Komatsu (JP); Masahiro Tazou, Komatsu (JP); Hiroyuki Kitaoka, Komatsu (JP)

(73) Assignee: KOMATSU LTD., Tokyo (JP)

( * ) Notice: Subject to any disclaimer, the term of this patent is extended or adjusted under 35 U.S.C. 154(b) by 255 days.

(21) Appl. No.: 14/379,536

(22) PCT Filed: Mar. 31, 2014

(86) PCT No.: PCT/JP2014/059424
§ 371 (c)(1),
(2) Date: Aug. 19, 2014

(87) PCT Pub. No.: WO2014/192404
PCT Pub. Date: Dec. 4, 2014

(65) Prior Publication Data
US 2016/0237646 A1    Aug. 18, 2016

(51) Int. Cl.
*B60K 11/00* (2006.01)
*B60K 11/04* (2006.01)
(Continued)

(52) U.S. Cl.
CPC ............ *E02F 9/0866* (2013.01); *B60K 11/02* (2013.01); *B60K 11/04* (2013.01); *B60K 13/04* (2013.01);
(Continued)

(58) Field of Classification Search
CPC .......... B60K 11/00; B60K 11/04; B60K 11/08
See application file for complete search history.

(56) References Cited

U.S. PATENT DOCUMENTS 5,816,351 A * 10/1998 Akira ..................... B60K 11/08
                                                       180/68.1
5,839,397 A    11/1998 Funabashi et al.
(Continued)

FOREIGN PATENT DOCUMENTS

CA    2 862 258 A1    7/2013
DE    295 04 867 U1    7/1996
(Continued)

OTHER PUBLICATIONS

The Office Action for the corresponding Japanese application No. 2014-534291, issued on Dec. 9, 2014.
(Continued)

*Primary Examiner* — Bryan Evans
(74) *Attorney, Agent, or Firm* — Global IP Counselors, LLP

(57) ABSTRACT

A wheel loader is provided with an engine compartment, a urea water injection device, a second side plate, a guiding member, and a suction part. The second side plate has a first outdoor air intake port. The guiding member is configured to guide outdoor air sucked in through the first outdoor air intake port onto the urea water injection device. The suction part sucks air into the engine compartment. The urea water injection device is disposed within an air flow produced between the suction part and the guiding member.

15 Claims, 12 Drawing Sheets

(51) Int. Cl.
  *B60K 11/08*  (2006.01)
  *E02F 9/08*   (2006.01)
  *F01P 5/06*   (2006.01)
  *B60K 13/04*  (2006.01)
  *F01N 3/20*   (2006.01)
  *F01N 3/035*  (2006.01)
  *B60K 11/02*  (2006.01)
  *E02F 3/28*   (2006.01)

(52) U.S. Cl.
  CPC ......... *E02F 9/0883* (2013.01); *E02F 9/0891* (2013.01); *F01N 3/035* (2013.01); *F01N 3/2066* (2013.01); *F01P 5/06* (2013.01); *B60Y 2200/415* (2013.01); *E02F 3/283* (2013.01); *F01N 2610/02* (2013.01); *F01N 2610/11* (2013.01); *F01N 2610/1453* (2013.01); *Y02T 10/24* (2013.01)

(56) References Cited

U.S. PATENT DOCUMENTS

| 6,192,677 | B1 | 2/2001 | Tost |
| 6,662,892 | B2 * | 12/2003 | Falk ................ B60K 11/08 180/68.1 |
| 2008/0169142 | A1 | 7/2008 | Kinoshita et al. |
| 2013/0014496 | A1 | 1/2013 | Fogg |
| 2014/0348716 | A1 | 11/2014 | Park |

FOREIGN PATENT DOCUMENTS

| DE | 198 56 366 C1 | 4/2000 |
| EP | 1 947 250 A2 | 7/2008 |
| EP | 2 500 542 A1 | 9/2012 |
| JP | 60-79155 A | 5/1985 |
| JP | 5-521 U | 1/1993 |
| JP | 10-338036 A | 12/1998 |
| JP | 2000-234351 A | 8/2000 |
| JP | 2002-161745 A | 6/2002 |
| JP | 2007-283801 A | 1/2007 |
| JP | 2011-6958 A | 1/2011 |
| JP | 2011-126301 A | 6/2011 |
| JP | 2011-220014 A | 11/2011 |
| JP | 2014-25254 A | 2/2014 |
| WO | 2009/142555 A1 | 11/2009 |
| WO | 2013/175981 A1 | 11/2013 |

OTHER PUBLICATIONS

The extended European search report for the corresponding European application No. 14744268.5, dated Jan. 28, 2016.

The international search report for the corresponding international application No. PCT/JP2014/059424, issued on Jun. 24, 2014.

The partial supplementary European search report for the corresponding European application No. 14744268.5, dated Oct. 15, 2015.

* cited by examiner

WORK VEHICLE

CROSS-REFERENCE TO RELATED APPLICATIONS

This application is a U.S. National stage application of International Application No. PCT/JP2014/059424, filed on Mar. 31, 2014.

BACKGROUND

Field of the Invention

The present invention relates to a work vehicle.

Background Information A work vehicle is provided with an engine compartment. An engine is contained inside the engine compartment. Various devices other than the engine are also contained inside the engine compartment. For example, an exhaust gas post-processing device for treating exhaust gas from the engine is contained inside the engine compartment in the work vehicle disclosed in Japanese Patent Laid-open No. 2014-025254.

When the engine or the various devices contained inside the engine compartment generate heat during operation, the temperature inside the engine compartment rises. As a result, members disposed inside the engine compartment are exposed to hot air inside the engine compartment. Cooling is required for members that are preferably not subject to high temperatures when such members are installed inside the engine compartment.

An object of the present invention is to provide cooling for members to be cooled disposed inside the engine compartment.

A work vehicle according to an aspect of the present invention is provided with an engine, an engine compartment, a member to be cooled, a vehicle body cover, a guiding member, and a suction part. The engine compartment contains the engine. The member to be cooled is disposed inside the engine compartment. The vehicle body cover defines the engine compartment. The vehicle body cover has an outdoor air intake port. The guiding member is configured to guide outdoor air sucked in from the outdoor air intake port onto the member to be cooled. The suction part is disposed inside the engine compartment. The suction part sucks air into the engine compartment. The member to be cooled is disposed within an air flow produced between the suction part and the guiding member.

According to this configuration, negative pressure is developed inside the engine compartment due to the suction inside the engine compartment brought about by the suction part. As a result, outdoor air is sucked into the engine compartment through the outdoor air intake port formed in the vehicle body cover. The outdoor air sucked into the engine compartment is guided by the guiding member toward the member to be cooled. Therefore, the member to be cooled can be cooled effectively with the outdoor air.

The work vehicle preferably is further provided with a cooling compartment, a partition wall, a cooling fan, and a duct. The partition wall provides partitioning between the engine compartment and the cooling compartment. The cooling fan is contained in the cooling compartment. The cooling fan exhausts air inside the cooling compartment to the outside of the cooling compartment. The duct has the aforementioned suction part and an exhaust part. The exhaust part is disposed on the air intake side of the cooling fan inside the cooling compartment.

According to this configuration, negative pressure is developed on the air intake side of the cooling fan due to the action of the cooling fan. As a result, the duct works to suck air into the engine compartment from the suction part and exhausts the suctioned air from the exhaust part. In this way, air can be sucked into the engine compartment by using the cooling fan that is typically mounted beforehand in a work vehicle.

The cooling fan preferably exhausts the air in the cooling compartment to the rear. The exhaust part is disposed in front of the cooling fan inside the cooling compartment.

The guiding member is preferably configured so that a flow passage area decreases as the flow passage approaches the member to be cooled. According to this configuration, the flow rate of the outdoor air guided toward the member to be cooled increases because the flow passage area gradually decreases.

The guiding section preferably has a guiding body part and a venting part. The guiding body part is disposed so that a gap formed between itself and the vehicle body cover. A peripheral part of the guiding body part is coupled to the vehicle body cover. The venting part is provided on the guiding body part and vents outdoor air onto the member to be cooled.

The venting part preferably has a tubular shape that extends toward the member to be cooled.

The outdoor air intake port preferably faces a first end part of the guiding body part. The venting part is provided on a second end part of the guiding body part. The guiding body part gradually becomes narrower from the first end part toward the second end part.

The member to be cooled is preferably positioned on a projection plane of the guiding body part in a direction orthogonal to the plane of the guiding body part facing the inside of the engine compartment.

The work vehicle is preferably further provided with a diesel particulate filter device, a selective catalyst reduction device, a connecting pipe, and a reducing agent injection device. The diesel particulate filter device treats exhaust gas from the engine. The selective catalyst reduction device treats exhaust gas from the engine. The connecting pipe connects the diesel particulate filter device and the selective catalyst reduction device. The member to be cooled is the reducing agent injection device which injects a reducing agent into the connecting pipe.

According to the present invention, cooling is made possible for a member to be cooled disposed inside the engine compartment.

DESCRIPTION OF EXEMPLARY EMBODIMENTS

Figure 1:
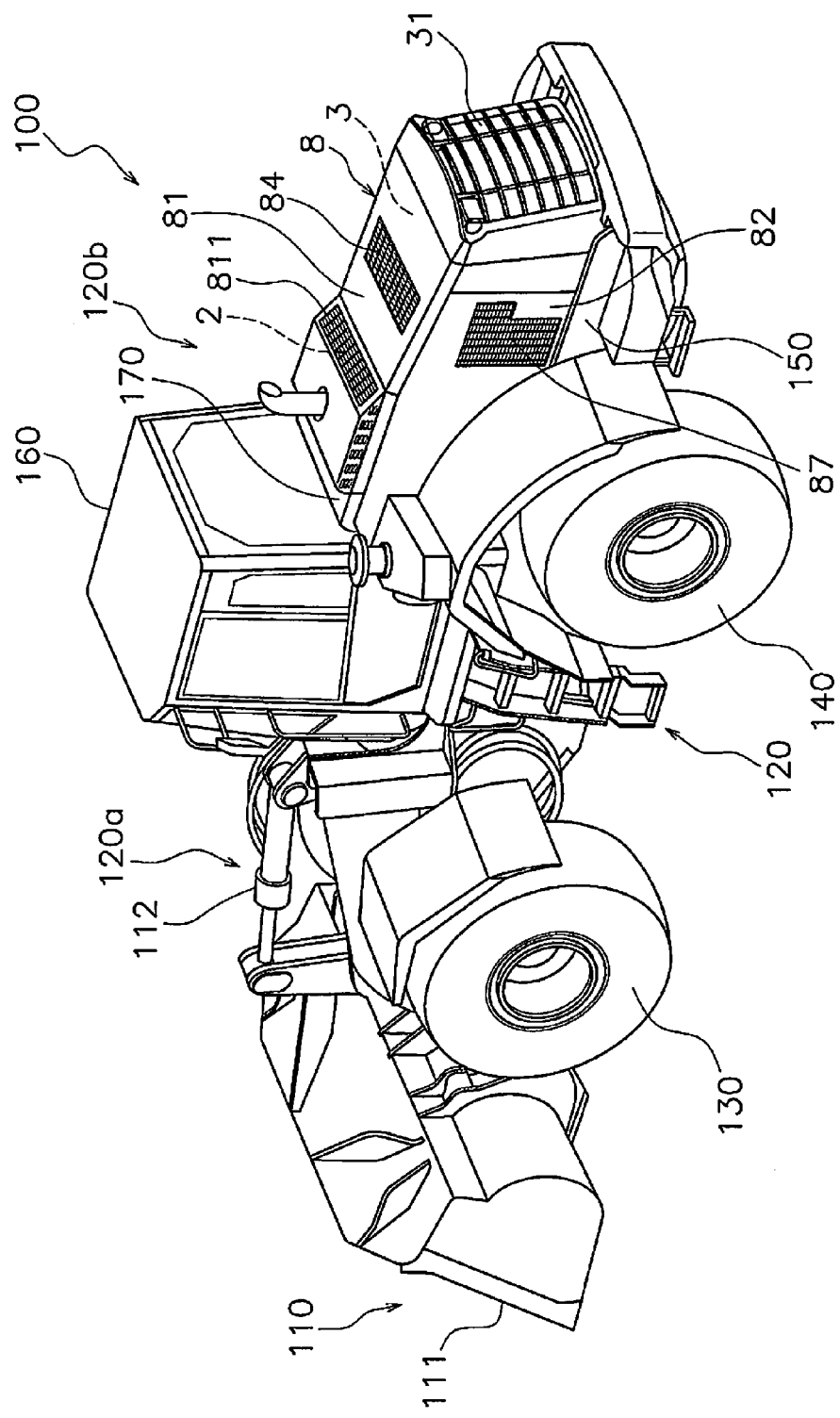
FIG. 1 is a perspective view of a wheel loader.

An exemplary embodiment of a wheel loader as an example of a work vehicle according to the present invention will be explained below with reference to the drawings. FIG. 1 is a perspective external view of a wheel loader 100 as seen from the left rear. In the following description, "right," "left," "up," and "down" indicate directions relative to a state of looking forward from the driver's seat. "Vehicle width direction" and "crosswise direction" have the same meaning. Moreover, the front-back direction signifies the front-back direction of the vehicle body.

As illustrated in FIG. 1, a wheel loader 100 includes a work implement 110, a vehicle body 120, front wheels 130, and rear wheels 140. The wheel loader 100 is capable of traveling due to the rotation of the front wheels 130 and the rear wheels 140, and desired work can be conducted using the work implement 110.

The work implement 110 is a mechanism driven by operating fluid pressurized by a hydraulic pump, and is disposed at the front of the vehicle body 120. The work implement 110 includes a bucket 111, a boom (not shown), a lift cylinder (not shown), and a bucket cylinder 112. The bucket 111 is attached to the tip of the boom. The boom is a member for lifting the bucket 111 and is mounted at the front part of a below-mentioned front vehicle section 120a. The lift cylinder drives the boom with pressure oil discharged from a work implement pump. The bucket cylinder 112 drives the bucket 111 with pressure oil discharged from the work implement pump.

The vehicle body 120 has the front vehicle section 120a and a rear vehicle section 120b. The front vehicle section 120a and the rear vehicle section 120b are connected to each other to allow swinging in the left-right direction. The work implement 110 and the front wheels 130 are provided on the front vehicle section 120a, and the rear wheels 140 are provided on the rear vehicle section 120b.

Figure 2:
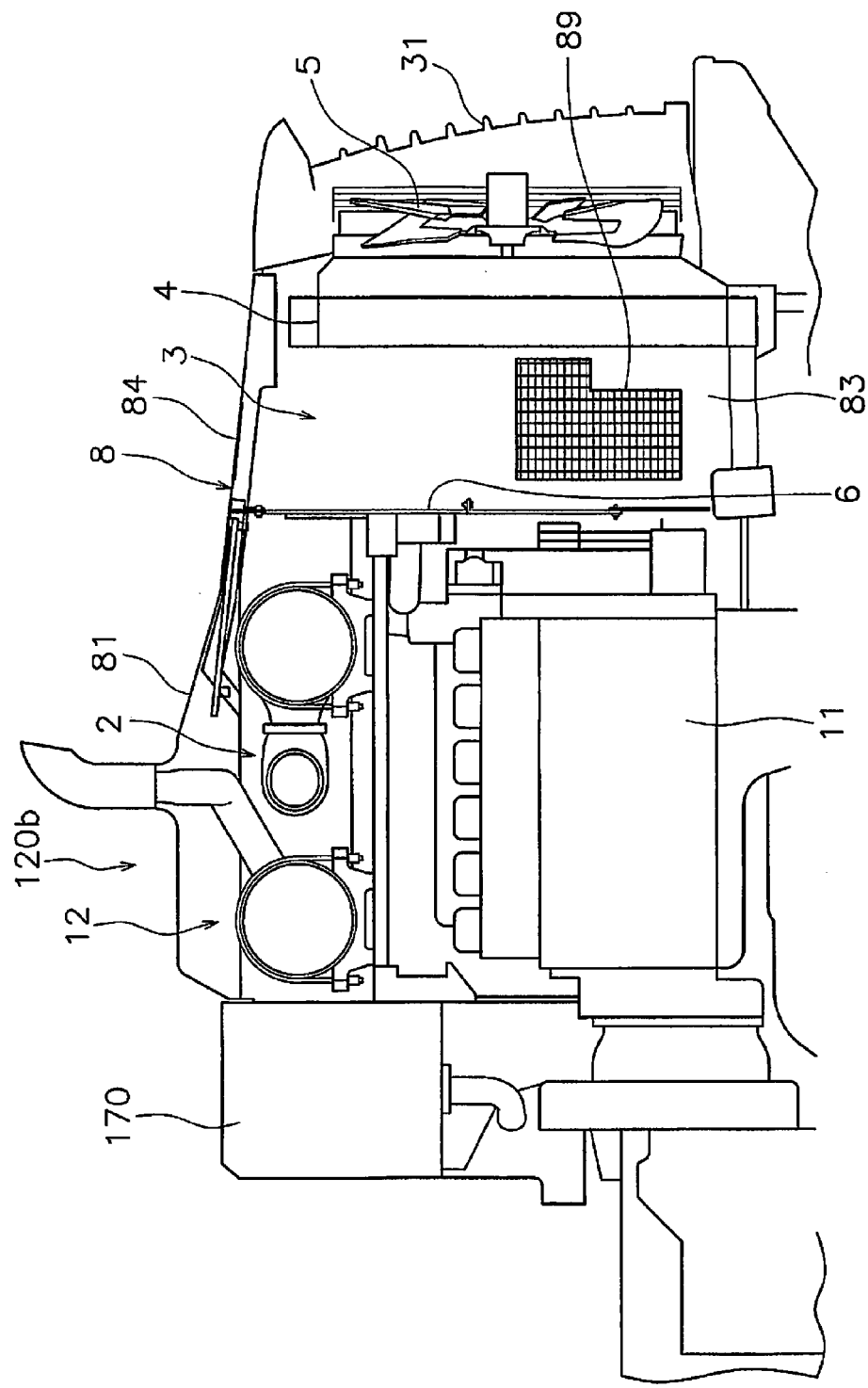
FIG. 2 is side cross-sectional view of a rear section of the vehicle.

The rear vehicle section 120b has a vehicle frame 150, a cab 160, a hydraulic fluid tank 170, an engine compartment 2, a cooling compartment 3, and a cooling fan 5 (see FIG. 2). The vehicle frame 150 is a frame that mainly configures the rear vehicle section 120b and supports the rear wheels 140, the cab 160, the hydraulic fluid tank 170, and an engine 11 and the like.

An operating cabin is provided inside the cab 160, and various operating members and an operating panel are provided inside the cab 160. The operating fluid tank 170 is disposed to the rear of the cab 160, and a plurality of hydraulic pumps (not shown) are disposed below the operating fluid tank 170. Operating fluid for driving the work implement 110 and the like is accumulated in the operating fluid tank 170, and the operating fluid is supplied to the work implement 110 and the like by the hydraulic pumps.

FIG. 2 is a side cross-section of the rear vehicle frame 120b as seen from the left. As illustrated in FIG. 2, the engine compartment 2 is disposed to the rear of the hydraulic fluid tank 170 and is defined by a vehicle body cover 8.

As illustrated in FIG. 1, the vehicle body cover 8 has a top plate 81, a first side plate 82, and a second side plate 83 (see FIG. 2). The upper plate 81 defines the upper surface of the engine compartment 2. The first and second side plates 82 and 83 define the side surfaces of the engine compartment 2. Specifically, the first side plate 82 defines the left side surface of the engine compartment 2, and the second side plate 83 defines the right side surface of the engine compartment 2.

As illustrated in FIG. 2, the engine 11 and an exhaust gas post-processing device 12 and the like are contained inside the engine compartment 2. The engine 11 is disposed in a lower part of the engine compartment 2 and is an engine in which the crankshaft extends in the front-back direction, that is, a so-called vertical mounted engine.

Figure 3:
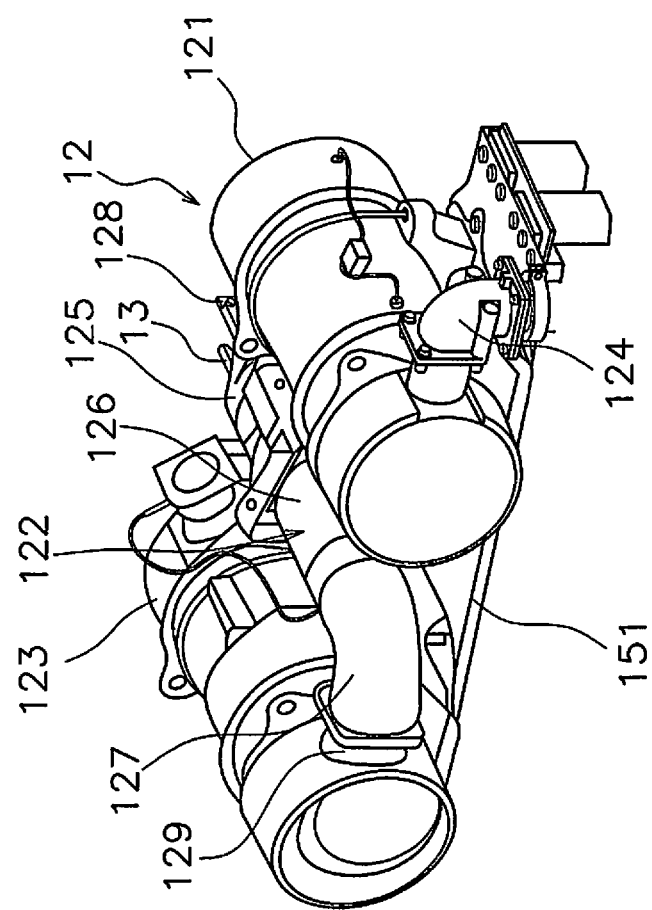
FIG. 3 is a perspective view of an exhaust gas post-processing device.

The exhaust gas post-processing device 12 is disposed in an upper part of the engine compartment 2. Specifically, the exhaust gas post-processing device 12 is disposed above the engine 11. FIG. 3 is a perspective view of the exhaust gas post-processing device 12 as seen from the left rear. As illustrated in FIG. 3, the exhaust gas post-processing device 12 includes, in order of the flow of exhaust gas, a diesel particulate filter device 121, a connecting pipe 122, and a selective catalyst reduction device 123. A urea water injection device 13 is attached to the connecting pipe 122. The urea water injection device 13 corresponds to the member to be cooled or to the reducing agent injection device of the present invention.

The diesel particulate filter device 121 is connected to the engine 11 through a pipe 124. The diesel particulate filter device 121 is a device for treating exhaust from the engine 11. Specifically, the diesel particulate filter device 121 is a device that collects, in a filter, particulate matter, such as soot, in the exhaust gas emitted from the engine 11. The diesel particulate filter device 121 burns the collected particulate matter with a heater provided with the filter. The diesel particulate filter device 121 is supported by a supporting member 151 attached to the vehicle frame 150.

The connecting pipe 122 is a pipe for connecting the diesel particulate filter device 121 and the selective catalyst reduction device 123. The entire connecting pipe 122 is formed in an S shape and includes a first bend section 125, a linear section 126, and a second bend section 127. The first bend section 125 is connected to an exhaust gas outlet port 128 of the diesel particulate filter device 121. The second bend section 127 is connected to an exhaust gas inlet port 129 of the selective catalyst reduction device 123. The linear section 126 extends between the first bend section 125 and the second bend section 127.

The urea water injection device 13 is attached to the first bend section 125. The urea water injection device 13 injects a urea water aqueous solution into the connecting pipe 122. The urea water aqueous solution is sucked up from a urea water aqueous solution tank (not shown) by a pump (not shown) and is supplied to the urea water injection device 13 via a pipe (not shown). The urea water aqueous solution injected into the connecting pipe 122 undergoes hydrolysis due to the heat from the exhaust gas and becomes ammonia. The ammonia is fed with the exhaust gas through the connecting pipe 122 to the selective catalyst reduction device 123.

The above-mentioned ammonia is used as a reducing agent to purify by reduction the nitrogen oxides in the exhaust gas in the selective catalyst reduction device 123. The selective catalyst reduction device 123 is supported by the supporting member 151 in the same way as the diesel particulate filter device 121.

The diesel particulate filter device 121 and the selective catalyst reduction device 123 are disposed parallel to each other. Specifically, the diesel particulate filter device 121 and the selective catalyst reduction device 123 both have substantially tubular shapes. The center axes of the diesel particulate filter device 121 and the selective catalyst reduction device 123 are both substantially disposed to extend substantially parallel to each other in the vehicle width direction. The linear section 126 in the connecting pipe 122 also has a substantially tubular shape and the center axis thereof extends in the vehicle width direction. Specifically, the center axis of the linear section 126 of the connecting pipe 122 is disposed substantially parallel to the center axes of the diesel particulate filter device 121 and the selective catalyst reduction device 123.

Figure 4:
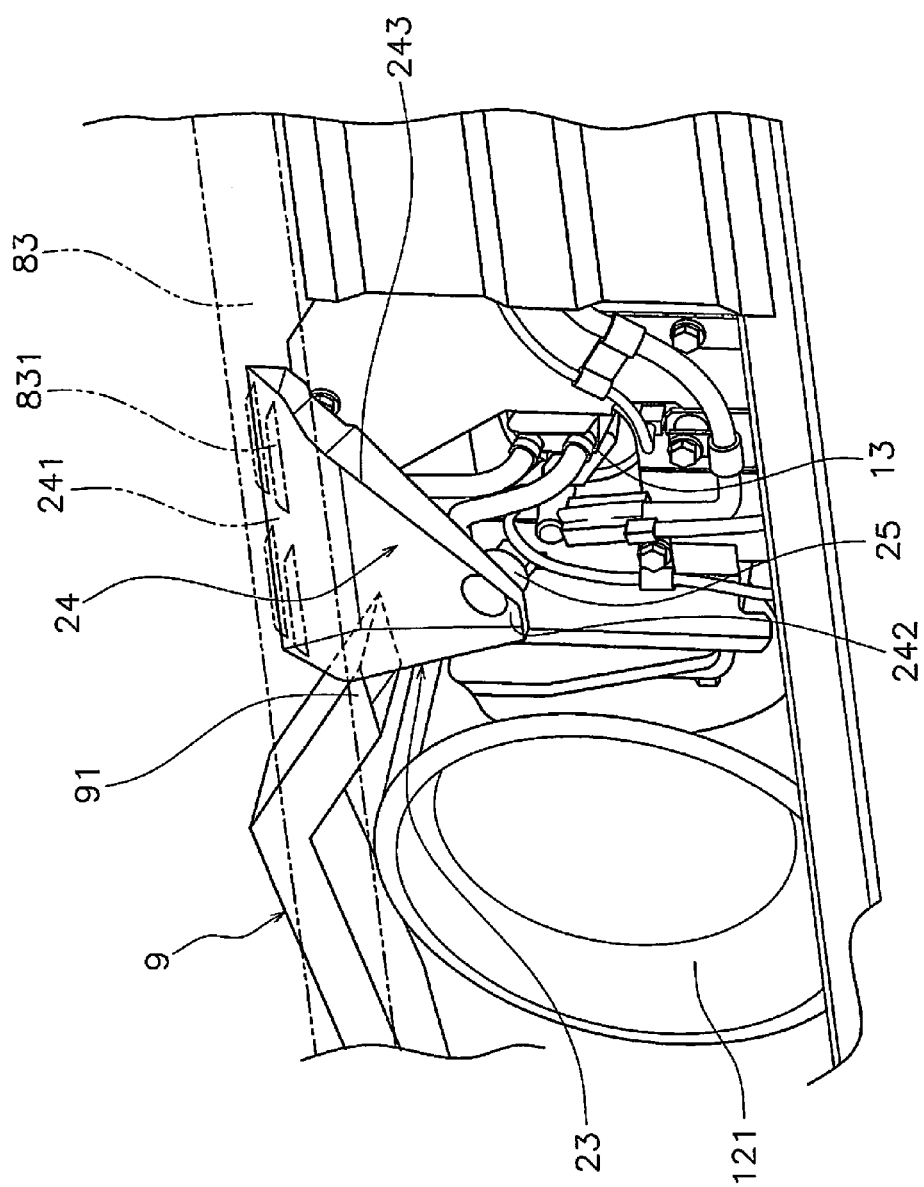
FIG. 4 is a perspective view of a vicinity of a urea water injection device.

FIG. 4 is a perspective view of a vicinity of the urea water injection device 13. An outline of the second side plate 83 is depicted with a chain double-dashed line so that the inside the engine compartment 2 can be seen in FIG. 4. The top plate 81 is not depicted.

As illustrated in FIG. 4, a first outdoor air intake port 831 is formed in the vehicle body cover 8. Specifically, the first outdoor air intake port 831 is formed in the second side plate 83. The first outdoor air intake port 831 is configured of a plurality of through-holes. The through-holes that configure the first outdoor air intake port 831 are shaped as slits that extend in the vehicle width direction. The first outdoor air intake port 831 corresponds to the outdoor air intake port of the present invention.

A guiding member 23 is attached to the inner surface of the second side plate 83. That is, the guiding member 23 is attached on a surface of the second side plate 83 facing the inside of the engine compartment 2. Specifically, the guiding member 23 is fixed to the inner surface of the second side plate 83 by welding and the like.

The guiding member 23 is configured to guide outdoor air sucked in from the first outdoor air intake port 831 to the urea water injection device 13. That is, the guiding member 23 forms a path for guiding outdoor air from the first outdoor air intake port 831 toward the urea water injection device 13.

The guiding member 23 has a guiding body part 24 and a venting part 25. The guiding body part 24 is disposed so that a gap is formed between the guiding body part 24 and the second side plate 83. A peripheral part 243 of the guiding body part 24 is coupled to the second side plate 83. Specifically, peripheral part 243 of the guiding body part 24 is fixed to the inner surface of the second side plate 83 by welding and the like. In this way, the guiding body part 24 forms a path for guiding the outdoor air in collaboration with the second side plate 83.

Figure 12:
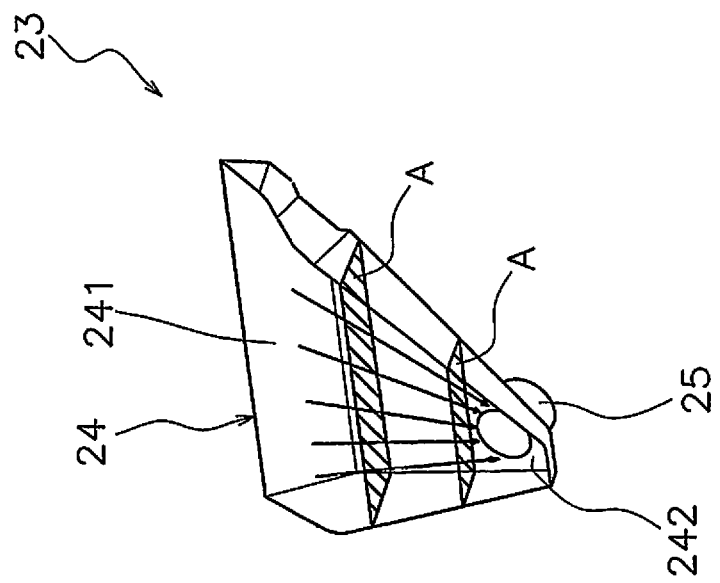
FIG. 12 is a perspective view of a guiding member.

The guiding body part 24 has a first end part 241 and a second end part 242. In the present exemplary embodiment, the first end part 241 is an upper end part of the guiding body part 24 and the second end part 242 is a lower end part of the guiding body part 24. The guiding body part 24 gradually becomes narrower from the first end part 241 toward the second end part 242. Specifically the guiding body part 24 has a substantially inverted triangular shape. As a result, the surface area of the flow path formed by the guiding member 23 decreases as the flow path approaches the urea water injection device 13. The first end part 241 faces the first outdoor air intake port 831. More specifically, a flow passage area A of the guiding body part 24 gradually becomes smaller from the first end part 241 toward the second end part 242 as illustrated in FIG. 12. The flow path of the outdoor air inside the guiding body part 24 is depicted with arrows.

As illustrated in FIG. 4, the venting part 25 is provided on the guiding body part 24. The venting part 25 is a portion for venting the outdoor air sucked in from the first outdoor air intake port 831 onto the urea water injection device 13. The venting part 25 has a tubular shape and extends toward the urea water injection device 13. The venting part 25 is provided at the second end part 242 of the guiding body part 24. Specifically, the venting part 25 communicates with the path formed by the guiding body part 24 and the second side plate 83 through an opening part formed at the second end part 242 of the guiding body part 24.

Figure 5:
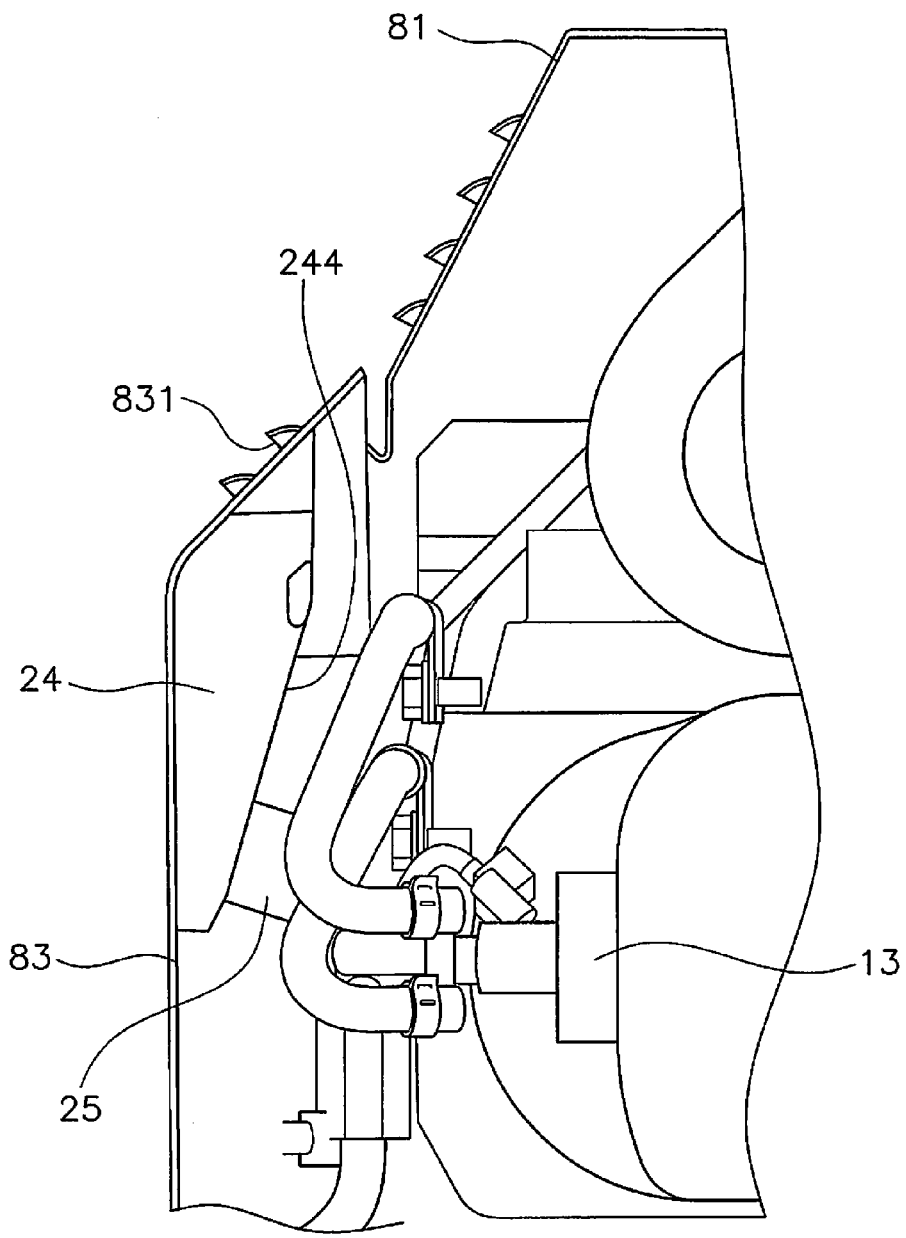
FIG. 5 is a cross-sectional view of the vicinity of the urea water injection device.

FIG. 5 is a cross-sectional view of the vicinity of the urea water injection device 13 as seen from the front. As illustrated in FIG. 5, the urea water injection device 13 is positioned on a projection plane of the guiding body part 24 in a direction orthogonal to a primary plane 244 of the guiding body part 24 facing the inside of the engine compartment 2. The gap between the guiding body part 24 and the second side plate 83 gradually becomes narrower from the first end part 241 toward the second end part 242.

The cooling compartment 3 is disposed to the rear of the engine compartment 2 as illustrated in FIG. 2. The engine compartment 2 and the cooling compartment 3 are partitioned by a partition wall 6. The cooling compartment 3 is defined by the vehicle body cover 8 in the same way as the engine compartment 2. Specifically, the upper surface of the cooling compartment 3 is defined by the top plate 81 and the sides of the cooling compartment 3 are defined by the first and second side plates 82 and 83.

Specifically, a front part of the top plate 81 defines the upper surface of the engine compartment 2, and a rear part of the top plate 81 defines the upper surface of the cooling compartment 3. The front parts of the first and second side plates 82 and 83 define the side surfaces of the engine compartment 2, and the rear parts of the first and second side plates 82 and 83 define the side surfaces of the cooling compartment 3.

A radiator 4 and the cooling fan 5 are contained inside the cooling compartment 3. The radiator 4 cools cooling water for the engine 11. The cooling fan 5 rotates to exhaust air from inside the cooling compartment 3 to the outside of the cooling compartment 3. Specifically, the cooling fan 5 rotates to exhaust air from inside the cooling compartment 3 to the outside of the cooling compartment 3 via a grille 31. Specifically, the cooling fan 5 produces an air flow toward the rear. In this case, the front of the cooling fan 5 is the air intake side of the cooling fan 5. The cooling fan 5 is disposed to the rear of the radiator 4. The grille 31 defines the rear surface of the cooling compartment 3.

Figure 6:
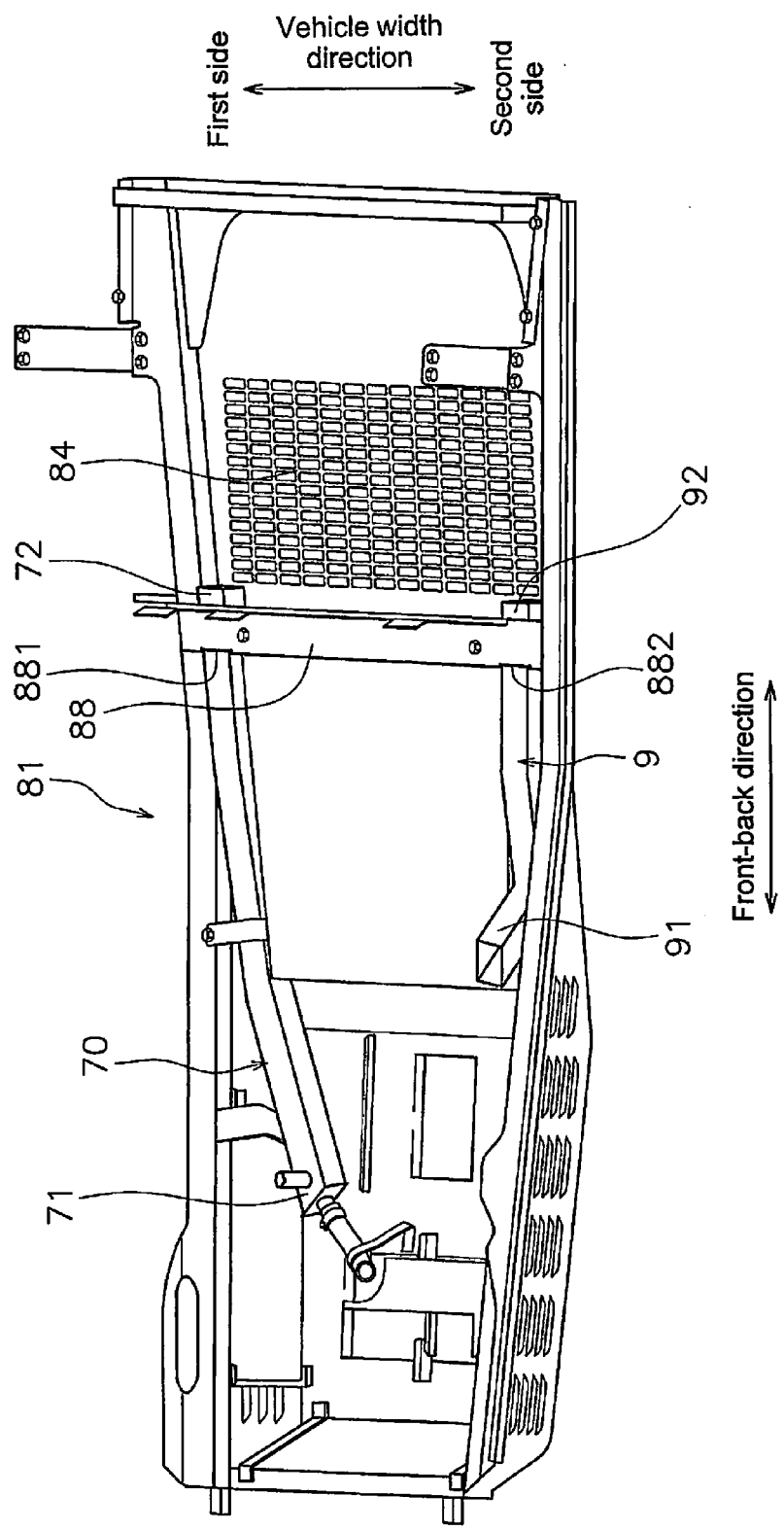
FIG. 6 is a perspective view of a top plate as seen from the under side.
Figure 7:
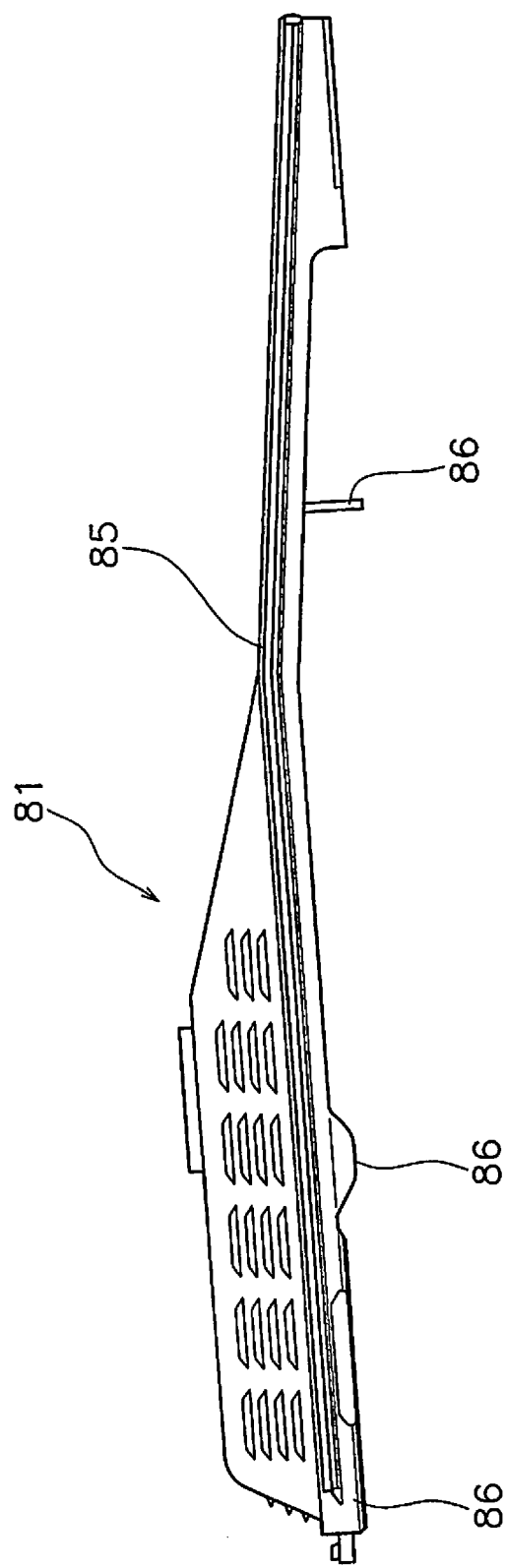
FIG. 7 is a side view of the top plate.

FIG. 6 is a perspective view of the under side of the top plate 81 and FIG. 7 is a side view of the top plate 81. As illustrated in FIGS. 6 and 7, the top plate 81 is a member that can be removed. Specifically, the top plate 81 is supported in a removable manner on the vehicle frame 150. While not limited in particular, the top plate 81 is attached to the vehicle frame 150 by a fastening member, such as a bolt. Specifically, a front part of the top plate 81 defines the upper surface of the engine compartment 2, and a rear part of the top plate 81 defines the upper surface of the cooling compartment 3.

The front part of the top plate 81 is formed to protrude upward. The rear part of the top plate 81 has a second outdoor air intake port 84 formed therein. The second outdoor air intake port 84 is an opening part for sucking outdoor air into the cooling compartment 3. The cooling compartment 3 communicates with the outside through the second outdoor air intake port 84.

The second outdoor air intake port 84 is positioned in front of the radiator 4 and the cooling fan 5 in the front-back direction while the top plate 81 is attached to the vehicle frame 150. The second outdoor air intake port 84 is positioned on the upper surface of the cooling compartment 3 and allows communication between the cooling compartment 3 and the outside while the top plate 81 is attached to the vehicle frame 150. The front end of the second outdoor air intake port 84 is positioned to the rear of the partition wall 6 in the front-back direction, and the rear end of the second outdoor air intake port 84 is positioned in front of the radiator 4 in the front-back direction. The second outdoor air intake port 84 is configured by a plurality of through-holes. The second outdoor air intake port 84 has a substantially rectangular shape as seen in a plan view.

Figure 8:
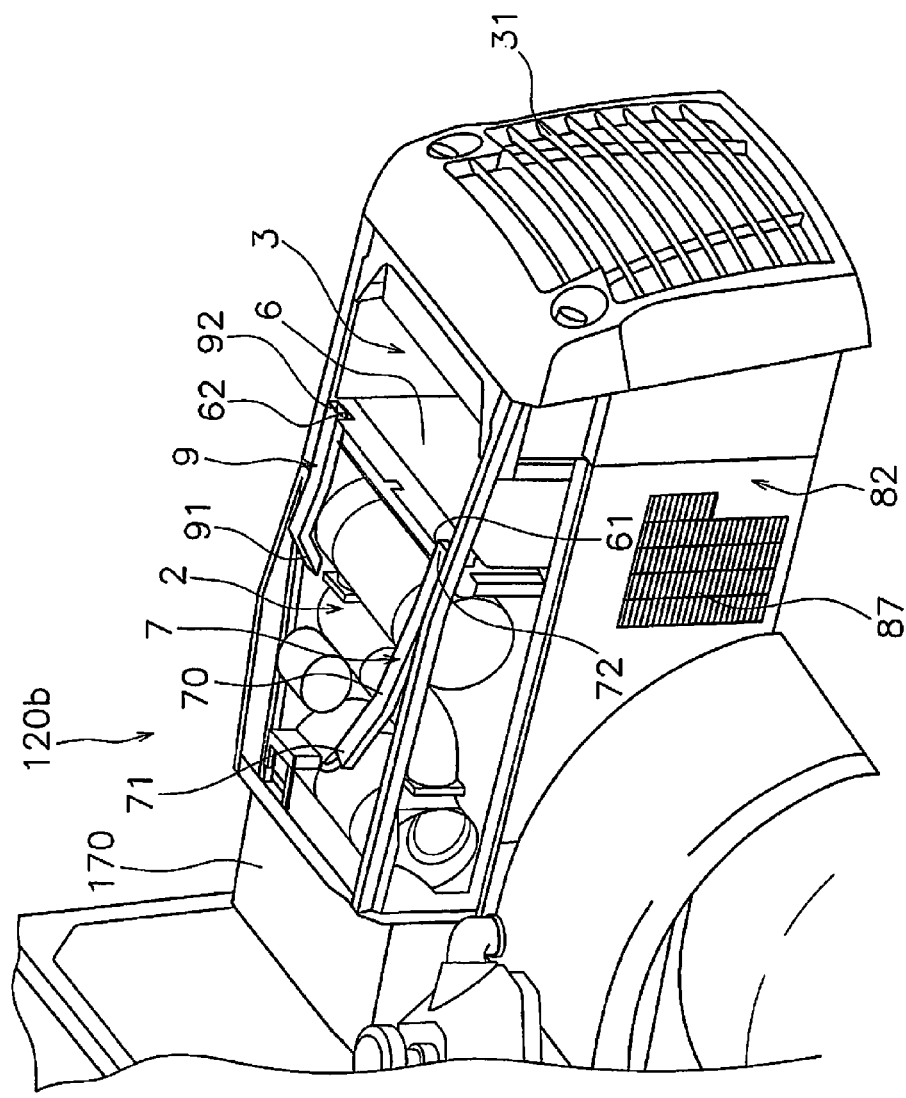
FIG. 8 is a perspective view of a rear vehicle section.

FIG. 8 is a perspective view of a rear vehicle section when the top plate 81 is removed. As illustrated in FIG. 8, a third outdoor air intake port 87 is formed in the first side plate 82 that is a portion of the vehicle body cover 8. The third outdoor air intake port 87 is an opening section for sucking in outdoor air into the cooling compartment 3. The cooling compartment 3 communicates with the outside through the third outdoor air intake port 87.

The third outdoor air intake port 87 is positioned in front of the radiator 4 and the cooling fan 5 in the front-back direction. Specifically, at least a portion of the third outdoor air intake port 87 is positioned in front of the radiator 4. The third outdoor air intake port 87 is positioned on the left side surface (example of the first side surface) of the cooling compartment 3 and allows communication between the cooling compartment 3 and the outside. The third outdoor air intake port 87 is configured of a plurality of through-holes. A fourth outdoor air intake port 89 (see FIG. 2) is formed in the second side plate 83 that defines the right side surface (example of the second side surface) of the cooling compartment 3. A detailed explanation of the fourth outdoor air intake port 89 is omitted because the configuration thereof is the same as that of the third outdoor air intake port 87.

As illustrated in FIG. 7, the top plate 81 has a top plate body section 85 and a plurality of leg parts 86. The top plate body section 85 is a portion that defines the upper surfaces of the engine compartment 2 and the cooling compartment 3. The leg parts 86 are portions that extend downward from the side edges of the top plate body section 85. A lower end of a below-mentioned first duct body part 70 is positioned higher than a lower end of the leg parts 86. As a result, when the top plate 81 is removed and placed on the ground, the leg parts 86 touch the ground and the first duct body part 70 does not touch the ground.

As illustrated in FIG. 8, the wheel loader 100 is further provided with first and second ducts 7 and 9. The first and second ducts 7 and 9 extend between the engine compartment 2 and the cooling compartment 3. Specifically, the first and second ducts 7 and 9 extend by passing through the partition wall 6. The second duct 9 corresponds to the duct in the present invention.

Figure 10:
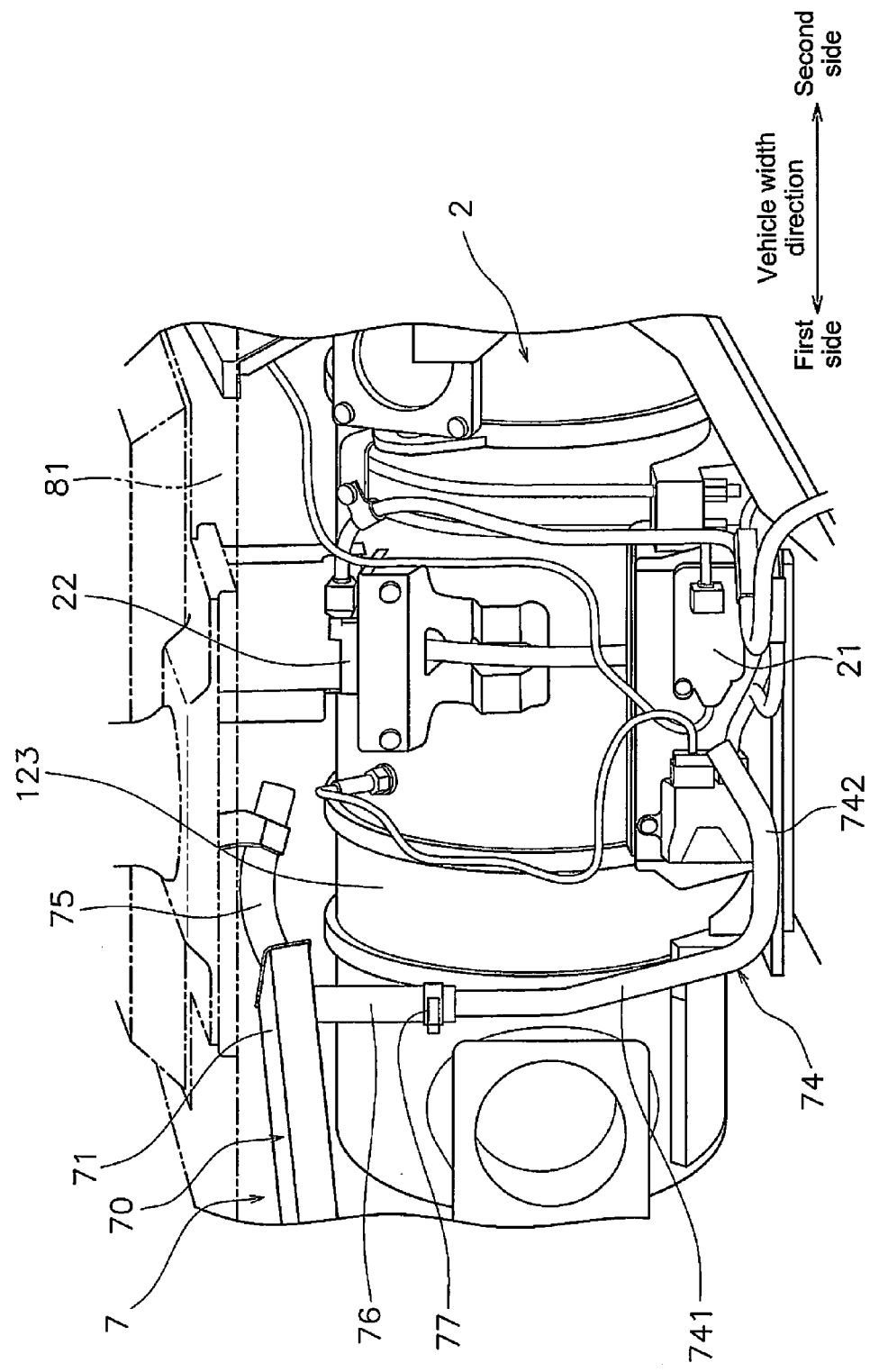
FIG. 10 is a perspective view of the inside of the engine compartment.

The first duct 7 has the first duct body part 70, a first intake part 74 (see FIG. 10), and a second intake part 75 (see FIG. 10). The first duct body part 70 has third and fourth end parts 71 and 72. The third end part 71 of the first duct body part 70 is positioned inside the engine compartment 2. The fourth end part 72 of the first duct body part 70 is positioned inside the cooling compartment 3. The fourth end part 72 is positioned in front of the radiator 4 and the cooling fan 5 in the front-back direction. Specifically, the fourth end part 72 is positioned near the partition wall 6.

Figure 9:
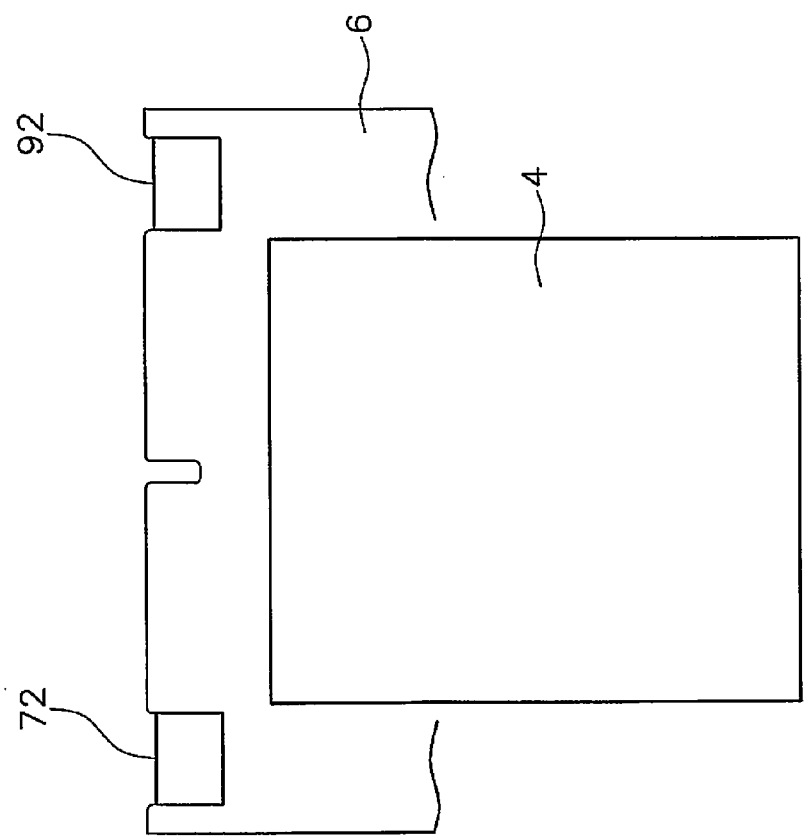
FIG. 9 is a schematic view of a positional relationship between a radiator and a fourth end part and a sixth end part.

As illustrated in FIG. 9, the fourth end part 72 is disposed in a position that does not face the radiator 4 in back view. Specifically, the fourth end part 72 is positioned in an upper end part and a left side end part (example of the first side end part) inside the cooling compartment 3. That is, the fourth end part 72 is positioned near the second outdoor air intake port 84 and the third outdoor air intake port 87. FIG. 9 is a schematic view depicting a positional relationship between the radiator 4 and the ducts in back view.

As illustrated in FIG. 6, the first duct body part 70 is attached to the top plate 81. Specifically, the first duct body part 70 is attached to the top plate 81 by a fixing means, such as a mounting bracket or by welding and the like. The first duct body part 70 can be integrally removed with the top plate 81 by removing the top plate 81 from the vehicle frame 150.

Specifically, the rear end part of the first duct body part 70 is supported by a beam member 88. The beam member 88 is fixed to the top plate body section 85. The beam member 88 extends in the vehicle width direction, or more specifically, extends from the left side end part (example of the first side end part) to the right side end part (example of the second side end part) of the top plate body section 85.

The beam member 88 has first and second through-holes 881 and 882 that run in the front-back direction. The first through-hole 881 is formed in the left side end part and the second through-hole 882 is formed in the right side end part. The first duct body part 70 is supported on the beam member 88 by passing through the first through-hole 881. A portion of the left side surface of the first duct body part 70 is welded to the inside surface of the top plate 81.

The first duct body part 70 is disposed in the left side end part (example of the first side end part) inside the engine compartment 2. The cross-section of the first duct body part 70 vertical to the longitudinal direction has a rectangular shape. The first duct body part 70 extends substantially in the front-back direction. The first duct body part 70 approaches the middle in the vehicle width direction as the first duct body part 70 extends to the front.

FIG. 10 is a perspective view of the inside of the engine compartment 2 as seen from the rear. As illustrated in FIG. 10, a first intake part 74 and a second intake part 75 are connected to the third end part 71 of the first duct body part 70.

The first intake part 74 extends from the third end part 71 of the first duct body part 70 toward a NOx sensor 21. Specifically, the first intake part 74 is disposed to suck in the air around the NOx sensor 21. The NOx sensor 21 is disposed inside the engine compartment 2. The NOx sensor 21 measures the NOx concentration inside the selective catalyst reduction device 123.

The first intake part 74 is detachably attached to the third end part 71 of the first duct body part 70. Specifically, the first intake part 74 is attached to the third end part 71 of the first duct body part 70 via a flexible pipe 76. The pipe 76 can be removed from the first intake part 74 by removing a band member 77. The first intake part 74 is fixed in the inside of the engine compartment 2 with a mounting bracket and the like.

The first intake part 74 has a substantially L shape. Specifically, the first intake part 74 has a first part 741 that extends downward and a second part 742 that extends in the vehicle width direction. The first part 741 extends downward from the third end part 71 of the first duct body part 70. The second part 742 extends from the lower end part of the first part 741 to the right side (example of the second side). Air around the NOx sensor 21 is sucked in from the distal end part of the second part 742.

The second intake part 75 extends from the third end part 71 of the first duct body part 70 toward a temperature sensor 22. Specifically, the second intake part 75 is disposed to suck in the air around the temperature sensor 22. The second intake part 75 extends from the third end part 71 of the first duct body part 70 to the right side (example of the second side). The second intake part 75 is fixed to the top plate 81 with a mounting bracket and the like. As a result, the second intake part 75 is removed integrally with the top plate 81.

The temperature sensor 22 is disposed inside the engine compartment 2. The temperature sensor 22 measures the temperature of the selective catalyst reduction device 123. The flow passage area in the first duct body part 70 is larger than the flow passage area of the first intake part 74 and larger than the flow passage area of the second intake part 75.

As illustrated in FIG. 8, the second duct 9 has fifth and sixth end parts 91 and 92. The fifth end part 91 is positioned inside the engine compartment 2. The sixth end part 92 is positioned inside the cooling compartment 3. The sixth end part 92 is positioned in front of the radiator 4 and the cooling fan 5 in the front-back direction.

When the cooling fan 5 is operating, the fifth end part 91 of the third duct 9 sucks in the air inside the engine compartment 2 as illustrated in FIG. 4. That is, the fifth end part 91 corresponds to the suction part of the present invention. The fifth end part 91 has an opening that faces the urea water injection device 13. The urea water injection device 13 is positioned within the air flow produced between the fifth end part 91 and the guiding member 23. The air flow is produced by the air inside the engine compartment being sucked in through the fifth end part 91.

The fifth end part 91 of the second duct 9 is positioned near the urea water injection device 13. While not limited in particular, the distance between the fifth end part 91 and the urea water injection device 13 may be 200 mm to 250 mm.

As illustrated in FIG. 8, when the cooling fan 5 is operating, the sixth end part 92 exhausts the suctioned air from the fifth end part 91 inside the cooling compartment 3. That is, the sixth end part 92 corresponds to the exhaust part of the present invention.

As illustrated in FIG. 9, the sixth end part 92 is disposed in a position that does not face the radiator 4 in back view. Specifically, the sixth end part 92 is positioned in an upper end part and a right side end part (example of the second side end part) inside the cooling compartment 3. That is, the sixth end part 92 is positioned near the second outdoor air intake port 84 and the fourth outdoor air intake port 89.

As illustrated in FIG. 6, the second duct 9 is attached to the top plate 81. Specifically, the second duct 9 is attached to the top plate 81 by a fixing means, such as a mounting bracket or by welding and the like. The second duct 9 can be integrally detached with the top plate 81 by detaching the top plate 81 from the vehicle frame 150.

Specifically, the rear end part of the second duct 9 is supported by the beam member 88. The second duct 9 is supported on the beam member 88 by passing through the second through-hole 882. A portion of the right side surface of the second duct 9 is welded to the inside surface of the top plate 81.

The second duct 9 is disposed in the right side end part (example of the second side end part) inside the engine compartment 2. The cross-section of the second duct 9 vertical to the longitudinal direction has a rectangular shape. The second duct 9 extends substantially in the front-back direction. The fifth end part 91 of the second duct 9 has an opening that faces the urea water injection device 13. Specifically, the second duct 9 mainly extends along the top plate 81 and a portion at the fifth end part 91 side is configured to face frontward and downward.

As illustrated in FIG. 8, the partition wall 6 has notch parts 61 and 62 for allowing the first and second ducts 7 and 9 to pass therethrough. Specifically, the first and second notch parts 61 and 62 are formed in the upper end part of the partition wall 6.

The first notch part 61 is formed in the upper end part and the left side end part (example of the first side end part) of the partition wall 6. The first duct body part 70 extends between the engine compartment 2 and the cooling compartment 3 via the first notch part 61.

The second notch part 62 is formed in the upper end part and the right side end part (example of the second side end part) of the partition wall 6. The second duct 9 extends between the engine compartment 2 and the cooling compartment 3 via the second notch part 62.

The wheel loader 100 according to the present exemplary embodiment has the following characteristics.

When the cooling fan 5 is operating, negative pressure is developed in the cooling compartment 3 and the second duct 9 works to suck air from the fifth end part 91 and exhaust air from the sixth end part 92. Negative pressure is developed inside the engine compartment 2 due to the fifth end part 91 of the second duct 9 sucking in the air that is inside the engine compartment 2. As a result, outdoor air is sucked into the engine compartment 2 through the first outdoor air intake port 831 formed in the second side plate 83. The outdoor air sucked into the engine compartment 2 is guided by the guiding member 23 toward the urea water injection device 13. Therefore, the urea water injection device 13 can be cooled effectively with the outdoor air. Negative pressure is developed mainly in the vicinity of the urea water injection device 13 because the fifth end part 91 opens toward the urea water injection device 13.

MODIFIED EXAMPLES

While an exemplary embodiment of the present invention has been described above, the present invention is not limited to the exemplary embodiment and the following modifications may be made within the scope of the present invention.

Modified Example 1

Figure 11:
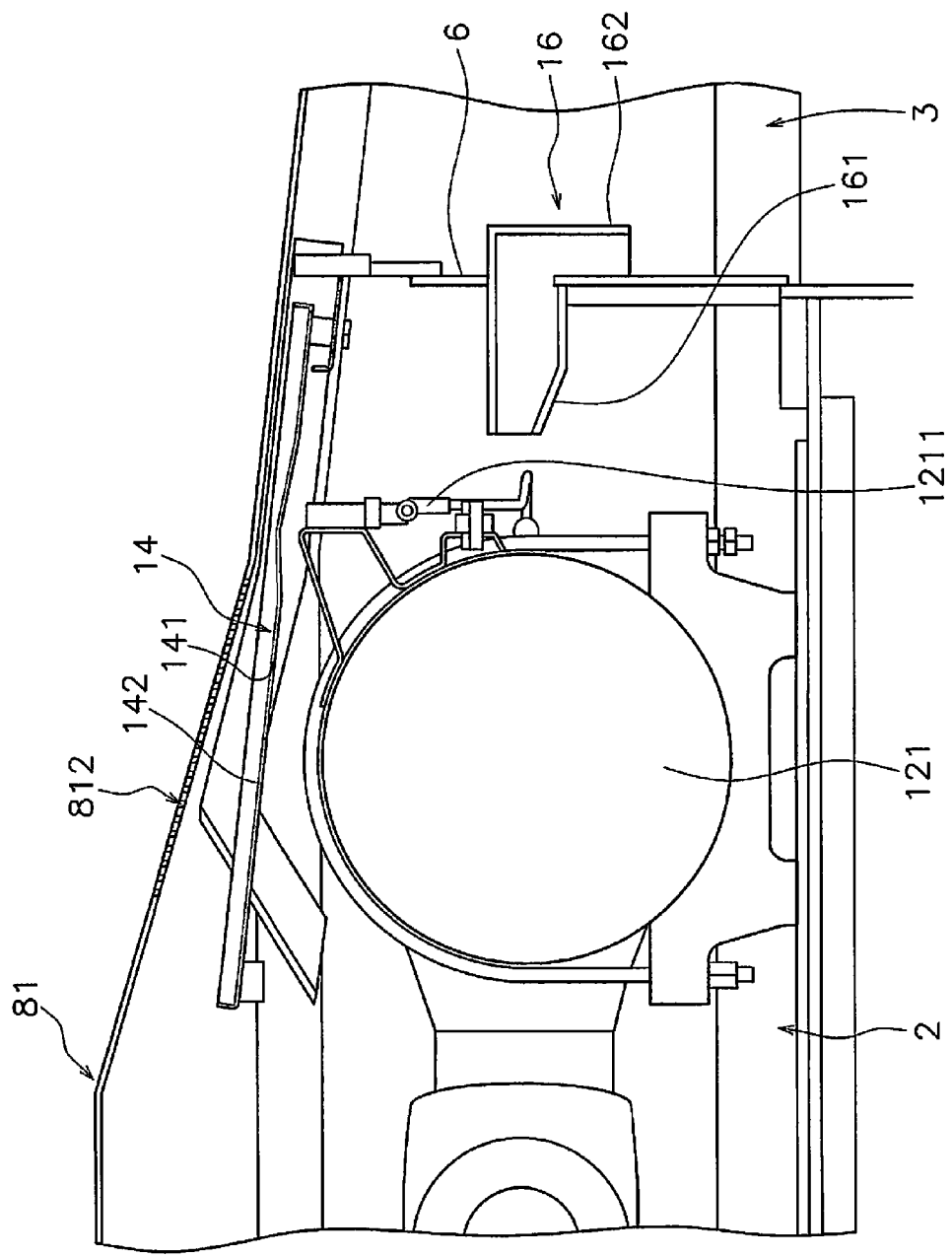
FIG. 11 is a cross-sectional view of the inside of the engine compartment according to a first modified example.

While the urea water injection device 13 has been described in the above exemplary embodiment as the member to be cooled of the present invention, the member to be cooled is not limited to the urea water injection device 13. For example, as illustrated in FIG. 11, a connector 1211 may be the member to be cooled. In this case, a plate-like member 14 disposed below the top plate 81 corresponds to the guiding member of the present invention. The connector 1211 is positioned to the rear of the diesel particulate filter device 121 inside the engine compartment 2. The connector 1211 is a connector for signal wiring.

The top plate 81 is further formed with a fifth outdoor air intake port 812. The fifth outdoor air intake port 812 is configured of a plurality of through-holes. The fifth outdoor air intake port 812 allows communication between the engine compartment 2 and the outside.

The plate-like member 14 is disposed below the fifth outdoor air intake port 812. The plate-like member 14 is a member for receiving rainwater and the like that intrudes into the engine compartment 2 from the fifth outdoor air intake port 812. The plate-like member 14 has a tray-like shape. The plate-like member 14 has a venting part 141. The venting part 141 is an opening part formed in a body part 142 of the plate-like member 14.

A third duct 16 extends between the engine compartment 2 and the cooling compartment 3. Specifically, the third duct 16 has a seventh end part 161 and an eighth end part 162. The seventh end part 161 is positioned inside the engine compartment 2 and the eighth end part 162 is positioned inside the cooling compartment 3. The seventh end part 161 is disposed near the connector 1211. While not limited in particular, the distance between the seventh end part 161 and the connector 1211 may be 70 mm to 100 mm. The third duct in the first modified example corresponds to the duct in the present invention.

When the cooling fan 5 is operating, negative pressure is developed in the cooling compartment 3, air is sucked into the engine compartment 2 from the seventh end part 161 of the third duct 16, and the suctioned air is exhausted to the cooling compartment 3 from the eighth end part 162. As a result, an air flow is produced that flows in order from the fifth outdoor air intake port 812 of the top plate 81, to the venting part 141 of the plate-like member 14, and to the seventh end part 161 of the third duct 16. The connector 1211 is disposed within the air flow produced between the plate-like member 14 and the seventh end part 161. The plate-like member 14 guides outdoor air toward the connector 1211. In the first modified example, the seventh end part 161 corresponds to the suction part of the present invention, and the eighth end part 162 corresponds to the exhaust part of the present invention.

Modified Example 2

While the guiding member 23 has a tubular venting part 25 in the above exemplary embodiment, the present invention is not limited as such. For example, the venting part may be an opening part formed in the guiding body part 24.

Modified Example 3

A partitioning member may be installed to surround the urea water injection device 13. Specifically, the partitioning member has a first partition part and a second partition part. The first partition part is disposed between the urea water injection device 13 and the diesel particulate filter device 121. The second partition part is disposed between the injection device and the selective catalyst reduction device.

Modified Example 4

The fourth end part 72 and the sixth end part 92 of the above exemplary embodiment are not limited to being positioned in front of the radiator 4 and the cooling fan 5. For example, the fourth end part 72 and the sixth end part 92 may be positioned to the rear of the radiator 4 and in front of the cooling fan 5. Specifically, the fourth and sixth end parts 72 and 92 may be positioned between the radiator 4 and the cooling fan 5 in the front-back direction.

Modified Example 5

The entire second outdoor air intake port 84 of the above exemplary embodiment is not limited to being positioned in front of the radiator 4 and the cooling fan 5. For example, if at least a portion of the second outdoor air intake port 84 is positioned in front of the radiator 4 and the cooling fan 5 in the front-back direction, the rear end part of the second outdoor air intake port 84 may be positioned to the rear of the radiator 4.

Modified Example 6

The cooling fan 5 in the above exemplary embodiment is not limited to rotating to exhaust to the rear the air inside the cooling compartment 3. For example, the cooling fan 5 may rotate to suck in air into the cooling compartment 3 via the grille 31. That is, an air flow flowing toward the front may be produced by the rotation of the cooling fan 5. In this case, the rear of the cooling fan 5 is the air intake side of the cooling fan 5. The air inside the cooling compartment 3 is exhausted to the outside of the cooling compartment 3 from the third outdoor air intake port 87 and the like. In this case, the sixth end part 92 of the second duct 9 is preferably disposed to the rear of the cooling fan 5 inside the cooling compartment 3. For example, the sixth end part 92 is disposed between the cooling fan 5 and the grille 31.

Modified Example 7

The wheel loader 100 of the above exemplary embodiment is not limited to being provided with the first and second ducts 7 and 9. For example, the wheel loader 100 may not have the first duct 7.

Modified Example 8

A diesel oxidation catalyst (DOC) may be used in place of the diesel particulate filter device 121 in the above exemplary embodiment.

Modified Example 9

While the wheel loader 100 to which the present invention is applied has been described in the above exemplary embodiment, the present invention may be applicable to another work vehicle, such as a motor grader.

What is claimed is:
1. A work vehicle comprising:
an engine;
an engine compartment containing the engine;
a member to be cooled disposed inside the engine compartment;
a vehicle body cover defining the engine compartment and having an outdoor air intake port;
a guiding member configured to guide outdoor air sucked in through the outdoor air intake port onto the member to be cooled;
a cooling compartment;
a partition wall that provides partitioning between the engine compartment and the cooling compartment;
a cooling fan for exhausting air from the cooling compartment, the cooling fan being disposed in the cooling compartment; and
a duct arranged to pass through the partition wall, the duct including a suction part and an exhaust part, the suction part being disposed inside the engine compartment to suck air from the engine compartment, the exhaust part being disposed on an air intake side of the cooling fan inside the cooling compartment,
wherein the member to be cooled is disposed to be within an air flow produced between the suction part and the guiding member.
2. The work vehicle according to claim 1, wherein the guiding member is configured so that a flow passage area decreases as the flow path approaches the member to be cooled.

3. The work vehicle according to claim 1, wherein
the guiding member has a guiding body part that is disposed with a gap formed between itself and the vehicle body cover and that has a peripheral part that is coupled to the vehicle body cover; and
a venting part that is provided on the guiding body part and that vents outdoor air onto the member to be cooled.

4. A work vehicle comprising:
an engine;
an engine compartment containing the engine;
a member to be cooled disposed inside the engine compartment;
a vehicle body cover defining the engine compartment and having an outdoor air intake port;
a guiding member configured to guide outdoor air sucked in through the outdoor air intake port onto the member to be cooled, the guiding member including a guiding body part and a peripheral part, the guiding body part being disposed with a gap formed between itself and the vehicle body cover, the peripheral part being coupled to the vehicle body cover;
a suction part for sucking air from the engine compartment, the suction part being disposed inside the engine compartment; and
a venting part that is provided on the guiding body part and that vents outdoor air onto the member to be cooled, the venting part having a tubular shape that extends toward the member to be cooled.

5. The work vehicle according to claim 3, wherein
the outdoor air intake port faces a first end part of the guiding body part;
the venting part is provided on a second end part of the guiding body part; and
the guiding body part gradually becomes narrower from the first end part toward the second end part.

6. A work vehicle comprising:
an engine;
an engine compartment containing the engine;
a member to be cooled disposed inside the engine compartment;
a vehicle body cover defining the engine compartment and having an outdoor air intake port;
a guiding member configured to guide outdoor air sucked in through the outdoor air intake port onto the member to be cooled, the guiding member including a guiding body part and a peripheral part, the guiding body part being disposed with a gap formed between itself and the vehicle body cover, the peripheral part being coupled to the vehicle body cover;
a suction part for sucking air from the engine compartment, the suction part being disposed inside the engine compartment; and
a venting part that is provided on the guiding body part and that vents outdoor air onto the member to be cooled,
the member to be cooled being positioned on a projection plane of the guiding body part in a direction orthogonal to a plane of the guiding body part facing the inside of the engine compartment.

7. The work vehicle according to claim 1, further comprising
a diesel particulate filter device for treating exhaust gas from the engine;
a selective catalyst reduction device for treating exhaust gas from the engine; and
a connecting pipe for connecting the diesel particulate filter device and the selective catalyst reduction device;
wherein the member to be cooled is a reducing agent injection device for injecting a reducing agent into the connecting pipe.

8. The work vehicle according to claim 1, wherein
the guiding member is configured so that a flow passage area decreases as the flow path approaches the member to be cooled.

9. The work vehicle according to claim 1, wherein
the guiding member has
a guiding body part that is disposed with a gap formed between itself and the vehicle body cover and that has a peripheral part that is coupled to the vehicle body cover; and
a venting part that is provided on the guiding body part and that vents outdoor air onto the member to be cooled.

10. The work vehicle according to claim 4, wherein
the outdoor air intake port faces a first end part of the guiding body part;
the venting part is provided on a second end part of the guiding body part; and
the guiding body part gradually becomes narrower from the first end part toward the second end part.

11. The work vehicle according to claim 5, wherein
the member to be cooled is positioned on a projection plane of the guiding body part in a direction orthogonal to a plane of the guiding body part facing the inside of the engine compartment.

12. The work vehicle according to claim 3, further comprising
a diesel particulate filter device for treating exhaust gas from the engine;
a selective catalyst reduction device for treating exhaust gas from the engine; and
a connecting pipe for connecting the diesel particulate filter device and the selective catalyst reduction device;
wherein the member to be cooled is a reducing agent injection device for injecting a reducing agent into the connecting pipe.

13. The work vehicle according to claim 6, further comprising
a diesel particulate filter device for treating exhaust gas from the engine;
a selective catalyst reduction device for treating exhaust gas from the engine; and
a connecting pipe for connecting the diesel particulate filter device and the selective catalyst reduction device;
wherein the member to be cooled is a reducing agent injection device for injecting a reducing agent into the connecting pipe.

14. The work vehicle according to claim 6, further comprising
a cooling compartment;
a partition wall that provides partitioning between the engine compartment and the cooling compartment;
a cooling fan for exhausting air from the cooling compartment and contained in the cooling compartment; and
a duct that passes through the partition wall, the duct including the suction part and an exhaust part, the exhaust part being disposed on the air intake side of the cooling fan inside the cooling compartment.

15. The work vehicle according to claim 4, further comprising
- a cooling compartment;
- a partition wall that provides partitioning between the engine compartment and the cooling compartment;
- a cooling fan for exhausting air from the cooling compartment and contained in the cooling compartment; and
- a duct that passes through the partition wall, the duct including the suction part and an exhaust part, the exhaust part being disposed on the air intake side of the cooling fan inside the cooling compartment.

* * * * *